United States Patent
Takasaka et al.

(10) Patent No.: US 9,237,097 B2
(45) Date of Patent: Jan. 12, 2016

(54) INFORMATION PROCESSING APPARATUS AND OPERATION METHOD THEREOF, COMPUTER PROGRAM, AND STORAGE MEDIUM

(71) Applicant: CANON KABUSHIKI KAISHA, Ohta-ku, Tokyo (JP)

(72) Inventors: Michiaki Takasaka, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/269,301

(22) Filed: May 5, 2014

(65) Prior Publication Data

US 2014/0241350 A1 Aug. 28, 2014

Related U.S. Application Data

(63) Continuation of application No. 13/141,382, filed as application No. PCT/JP2010/052805 on Feb. 17, 2010, now Pat. No. 8,761,013.

(30) Foreign Application Priority Data

Feb. 25, 2009 (JP) ................. 2009-043148

(51) Int. Cl.
- *H04L 12/28* (2006.01)
- *H04L 12/721* (2013.01)
- *H04L 12/801* (2013.01)
- *G06F 15/173* (2006.01)
- *H04L 12/42* (2006.01)

(52) U.S. Cl.
CPC .......... *H04L 45/72* (2013.01); *G06F 15/17337* (2013.01); *H04L 12/42* (2013.01); *H04L 47/10* (2013.01)

(58) Field of Classification Search
CPC .... G06F 15/17337; H04L 45/72; H04L 12/43
See application file for complete search history.

(56) References Cited

U.S. PATENT DOCUMENTS

| 4,779,087 A | 10/1988 | Fukuda et al. ........... 340/825.05 |
| 4,809,267 A | 2/1989 | Higuchi et al. ................. 370/86 |
| 5,155,858 A | 10/1992 | DeBruler et al. ............. 395/800 |

(Continued)

FOREIGN PATENT DOCUMENTS

| CN | 1504913 A | 6/2004 |
| JP | 61-187445 A | 8/1986 |
| JP | 4-192942 A | 7/1992 |

OTHER PUBLICATIONS

T. Shimizu, "Exploring the Reality of IBM Token-Ring," Nikkei Byte, No. 22, pp. 137-151, Jul. 1, 1986.

(Continued)

*Primary Examiner* — Brian O'Connor
(74) *Attorney, Agent, or Firm* — Fitzpatrick, Cella, Harper & Scinto (57) ABSTRACT

In an information processing system in which a plurality of modules are connected to a ring bus, data transfer efficiency is enhanced by deleting an unnecessary packet from the ring bus. This invention relates to an information processing system in which a plurality of modules that execute data processing are connected to a ring bus. More particularly, this invention relates to a ring bus operation technique that allows efficient data transfer by monitoring a flag of a packet, and removing an unnecessary packet from the ring bus.

21 Claims, 6 Drawing Sheets (56) References Cited

U.S. PATENT DOCUMENTS

| | | | |
|---|---|---|---|
| 6,865,188 B1 * | 3/2005 | Stirling et al. | 370/460 |
| 6,996,647 B2 | 2/2006 | Raghavan et al. | 710/240 |
| 7,239,645 B2 | 7/2007 | Suri et al. | 370/412 |
| 7,292,597 B2 | 11/2007 | Mills et al. | 370/433 |
| 7,317,719 B2 | 1/2008 | Porter | 370/360 |
| 7,414,984 B2 | 8/2008 | Mack et al. | 370/254 |
| 7,433,307 B2 | 10/2008 | Hooper et al. | 370/231 |
| 7,480,706 B1 | 1/2009 | Hooper et al. | 709/223 |
| 7,641,131 B2 | 1/2010 | Shank et al. | 239/13 |
| 7,649,835 B2 | 1/2010 | Hall et al. | 370/216 |
| 7,710,904 B2 | 5/2010 | Chrysos | 370/258 |
| 7,729,297 B2 | 6/2010 | Hall et al. | 370/258 |
| 8,004,966 B2 | 8/2011 | Koch et al. | 370/222 |
| 8,300,535 B2 | 10/2012 | Sakamoto et al. | 370/235 |
| 8,417,835 B2 * | 4/2013 | Takasaka et al. | 710/3 |
| 8,438,239 B2 | 5/2013 | Mellott et al. | 709/217 |
| 8,457,149 B2 * | 6/2013 | Kimura et al. | 370/452 |
| 8,503,482 B2 | 8/2013 | Zhou et al. | 370/498 |
| 8,588,234 B2 | 11/2013 | Sakamoto et al. | 370/394 |
| 8,761,013 B2 * | 6/2014 | Takasaka et al. | 370/231 |
| 8,774,234 B2 * | 7/2014 | Sakamoto et al. | 370/546 |
| 8,995,476 B2 * | 3/2015 | Sakamoto et al. | 370/546 |
| 2002/0191601 A1 | 12/2002 | Cook | 370/389 |
| 2010/0235609 A1 | 9/2010 | Inoue et al. | 712/29 |
| 2010/0293310 A1 | 11/2010 | Kimura et al. | 710/105 |
| 2011/0320677 A1 | 12/2011 | Sakamoto et al. | 710/316 |

OTHER PUBLICATIONS

"Bubble (computing)," Apr. 4, 2008 (retrieved on Aug. 18, 2015, from https://en.wikipedia.org/w/index.php?title=Bubble_(computing)&oldid=203253475).

* cited by examiner

INFORMATION PROCESSING APPARATUS AND OPERATION METHOD THEREOF, COMPUTER PROGRAM, AND STORAGE MEDIUM

CROSS REFERENCE TO RELATED APPLICATION

This application is a continuation of U.S. application Ser. No. 13/141,382 filed on Jun. 22, 2011, the entire disclosure of which is incorporated by reference herein. U.S. application Ser. No. 13/141,382 is a national-stage entry of International Application No. PCT/JP2010/052805 filed Feb. 17, 2010, which claims the benefit of priority of Japanese Patent Application No. 2009-043148 filed on Feb. 25, 2009.

TECHNICAL FIELD

The present invention relates to an information processing apparatus and operation method thereof, a computer program, and a storage medium.

BACKGROUND ART

Various ring-shaped communication networks (circuit networks) have been proposed and have prevailed. For example, the LAN (Local Area Network) specification includes a so-called token ring (see ISO/IEC 8802-5: 1998).

Data transfer in a token ring system will be briefly described below. A node that wants to transmit data acquires a token called a free token, which is not occupied by any node, and is going around a ring bus. The node that acquired the free token copies a destination identifier and processing data to the token, and outputs that token onto the ring bus to transmit it to a destination module. As described above, in the token ring system, a frame called a token is transferred in turn from a node to another node, and then to the next node, which are allocated on the ring bus, thus transmitting that frame to a target terminal.

On the other hand, when a receiving node receives a token which has a destination as the self node, it copies processing data and enters the received token, which is set with a reception completion flag indicating completion of reception, again onto the ring bus. This entry is done to inform the transmission source node of successful data transfer, and the transmission source node re-transmits the identical token if the token which is not set with the reception completion flag is returned. In this way, the receiving node sets the reception completion flag in the token, and returns that token to the transmission source node, thus implementing data transfer.

DISCLOSURE OF INVENTION

When an information processing system, in which a plurality of modules that execute data processing are connected to a ring bus, adopts the aforementioned token ring bus system, a token has to be returned to a transmission source irrespective of a success or failure of reception. That is, even when the reception has succeeded, no one can copy data to the token until the transmission source releases the returned token, resulting in inefficiency.

The present invention allows efficient packet transfer in an information processing system, in which a plurality of modules that execute data processing are connected to a ring bus.

One aspect of embodiments of the present invention relates to an information processing apparatus including a plurality of modules, which are connected to a ring bus, and each of which is configured to receive a packet that stores data from one neighboring module, and to transmit the packet to the other neighboring module after predetermined processing, characterized in that, each module comprises, identification means for identifying a packet received from another module to determine whether or not the received packet is a packet to be processed by a self-module, reception means for, when the identification means determines that the received packet is a packet to be processed by the self-module, extracting data to be processed from the packet, processing means for processing the extracted data, modification means for, when the processing means processes the data, setting a first flag indicating validity of data in the received packet to have a value indicating that the data is invalid, and transmission means for transmitting the packet to the other module.

Further features of the present invention will become apparent from the following description of exemplary embodiments (with reference to the attached drawings).

BEST MODE FOR CARRYING OUT THE INVENTION

Embodiments of the present invention will be described hereinafter. This embodiment relates to a data processing system in which a plurality of modules that execute data processing are connected to a ring bus. Of course, the embodiments to be described hereinafter provide disclosures for facilitating implementation by those who are skilled in the art of the present invention, and are just some embodiments included in the technical scope of the present invention settled by the scope of the claims. Therefore, it is obvious for those who are skilled in the art that even embodiments that are not directly described in the specification of the present invention are incorporated in the technical scope of the present invention as long as they have common technical ideas.

Note that a plurality of embodiments will be described for convenience sake. However, as is easily understood for those who are skilled in the art, not only these embodiments can form independent inventions, but a plurality of embodiments can also be combined as needed to form the invention.

Figure 1:
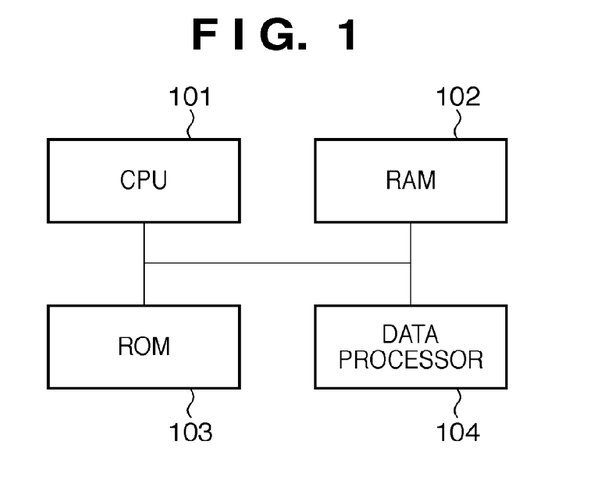
FIG. 1 is a block diagram showing an example of the arrangement of a data processing system.

The arrangement of an information processing system according to an embodiment corresponding to one aspect of the present invention will be described below with reference to FIG. 1. A CPU 101 is a control unit having a function of controlling the overall operations of a data processing system.

A RAM 102 is a readable/writable memory which stores input data to be processed by the CPU 101, output data after the processing, preset parameter data to a data processor 104, and the like. A ROM 103 is a readable memory that can hold the processing sequence, constants such as preset parameters, and the like of the CPU 101. The data processor 104 includes an arrangement and modules disclosed by the present invention. Respective modules are connected to a ring bus. A programmable custom IC chip may implement the data processor 104. The chip includes, for example, an ASIC (Application Specific Integrated Circuit) or FPGA (Field Programmable Gate Array).

The arrangement of the data processor 104 will be described below with reference to FIG. 2. The data processor 104 includes a plurality of modules 201 to 204. A ring bus 205 is used to transfer packets among the modules. The modules 201 to 204 are connected to the ring bus 205. Each module is configured to receive a data packet from one neighboring module, and to transmit the data packet to the other neighboring module after predetermined processing. A packet exchanged by the modules moves in one direction on the ring bus. In the following description, a ring-shaped bus on which data (or packet) goes around in a single direction will be simply referred to as a ring bus.

An input/output buffer 206 is used to input/output data. Each of the modules 201 to 204 of this embodiment has data processor identification information, which is used to identify the self-module, and is described as "ID" in FIG. 2 for the sake of simplicity. In the following description of the embodiments of the present invention, that information is also described as "ID". Note that the module 201 with ID=1 is connected to the input/output buffer 206 to manage input and output data.

Figure 3:
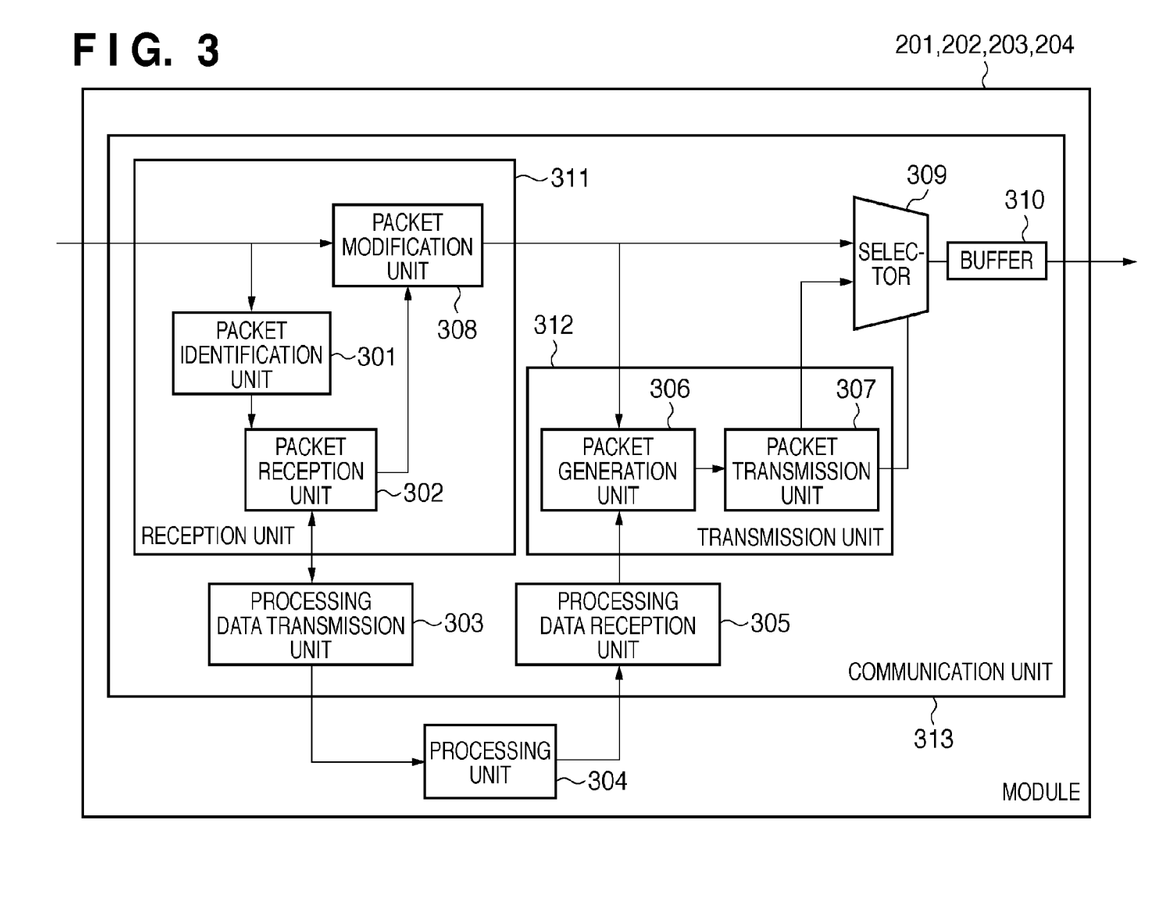
FIG. 3 is a block diagram showing an example of the arrangement of a module.

The arrangement of the respective modules 201 to 204 in the data processor will be described below with reference to FIG. 3. Referring to FIG. 3, a packet identification unit 301 checks whether or not to fetch a packet coming from another module. When the packet identification unit 301 receives a packet holding a transmission source ID that matches a self waiting ID, it outputs the packet to a packet reception unit 302.

The packet reception unit 302 executes packet reception processing. A processing data transmission unit 303 transmits processing data to a processing unit 304. The processing unit 304 executes actual data processing. A processing data reception unit 305 receives processed data from the processing unit 304. A packet generation unit 306 generates a packet based on the processed data received from the processing unit 304 and an output from a packet modification unit 308.

A packet transmission unit 307 outputs a packet onto the ring bus. The packet modification unit 308 modifies values of a data valid flag 401 and stall flag 404 of a packet, which will be described later with reference to FIG. 4, in accordance with an instruction from the packet reception unit 302. A selector 309 selects one of the packets from the packet transmission unit 307 and that from the packet modification unit 308 based on an instruction from the packet transmission unit 307. The selector 309 selects the packet output from the packet modification unit 308 and outputs that packet if there is no instruction from the packet transmission unit 307. A buffer 310 is used to transfer a packet one after another.

In the above arrangement, each of the modules 201, 202, 203, and 204 includes the processing unit 304 and a communication unit 313. The communication unit 313 includes the processing data transmission unit 303, the processing data reception unit 305, the selector 309, the buffer 310, a reception unit 311, and a transmission unit 312. Furthermore, the reception unit 311 includes the packet identification unit 301, packet reception unit 302, and packet modification unit 308. Also, the transmission unit 312 includes the packet generation unit 306 and packet transmission unit 307.

In the following description, this embodiment will explain a case in which the processing unit 304 outputs one output data by processing one input data. In this case, assume that another input data cannot be input from when input data is input to the processing unit 304 until output data is obtained. For this reason, the packet reception unit 302 has to suspend reception of a packet according to the status of the processing unit 304.

Figure 4:
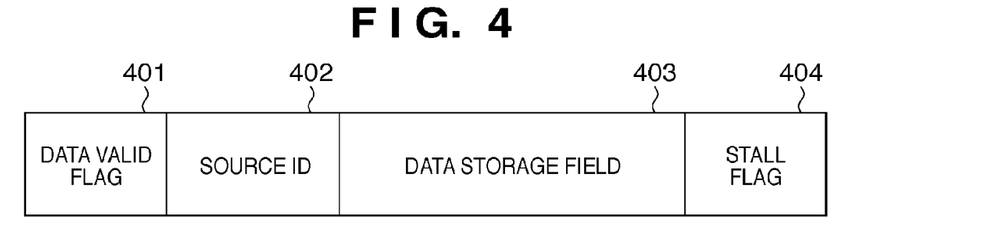
FIG. 4 is a view showing an example of the format of a packet.

FIG. 4 shows the format of a packet required to exchange data among the modules. The data valid flag 401 is first flag information used to check validity of data in a packet. For example, if the data valid flag 401 is "1", data is valid; if it is "0", data is invalid.

A transmission source ID 402 is an identifier of a transmission source that stores an identifier of the module that transmitted a packet. A data storage field 403 stores a processing data main body. The stall flag 404 is second flag information, which is set to be "1" when the module suspends packet processing. That is, if the stall flag 404 is "1", it indicates that the packet processing is suspended. Note that the processing is suspended, for example, when a certain module receives data but it cannot process the data since the processing unit 304 is busy. The stall flag 404 is set to be "0" as an initial value. That is, when the stall flag has the initial value, this means that a module on the ring bus, which is to receive that packet, has not processed the corresponding packet yet.

Each module can set a waiting packet ID. The packet identification unit 301 fetches a packet when the waiting packet ID matches the transmission source ID 402 of the packet that flows through the ring bus. For example, a case will be examined below wherein a data path is to be configured in the order of module 1, module 4, module 2, module 3, and module 1. In this case, the waiting packet ID of module 1 is set to be "3", that of module 2 is set to be "4", that of module 3 is set to be "2", and that of module 4 is set to be "1". By respectively setting the waiting packet IDs of the modules in this way, the data path can be formed. Assume that the waiting packet ID is set in advance for each module, and its information is stored in the packet identification unit 301.

A data reception method in the communication unit 313 will be described below. For example, a case will be examined below wherein data transfer is executed from module 1 with ID=1 to module 3 with ID=3 in FIG. 2. At this time, the packet identification unit 301 of module 3 acquires a packet in which the data valid flag 401 is valid, and compares the transmission source ID 402 of that packet with the self waiting packet ID. If these IDs are equal to each other, the packet identification unit 301 transmits that packet to the packet reception unit 302.

The processing data transmission unit 303 determines whether or not the processing unit 304 is ready to execute processing. If the processing data transmission unit 303 determines that the processing unit 304 is ready, the packet reception unit 302 extracts data to be processed from the acquired packet, and transmits it to the processing data transmission unit 303. In this case, since that packet already has no use, the packet reception unit 302 instructs the packet modification unit 308 to set the data valid flag 401 of the packet to be invalid (0).

On the other hand, if the processing data transmission unit 303 determines that the processing unit 304 is busy, the packet reception unit 302 instructs the packet modification unit 308 to set the stall flag 404 of the packet to be "1". The packet modification unit 308 modifies the data valid flag 401 or stall flag 404 according to an instruction from the packet reception unit 302, and transmits the packet to the selector 309. The selector 309 selects one of the packet input from the packet modification unit 308 and that input from the packet transmission unit 307, and transmits it to the buffer 310.

Figure 5:
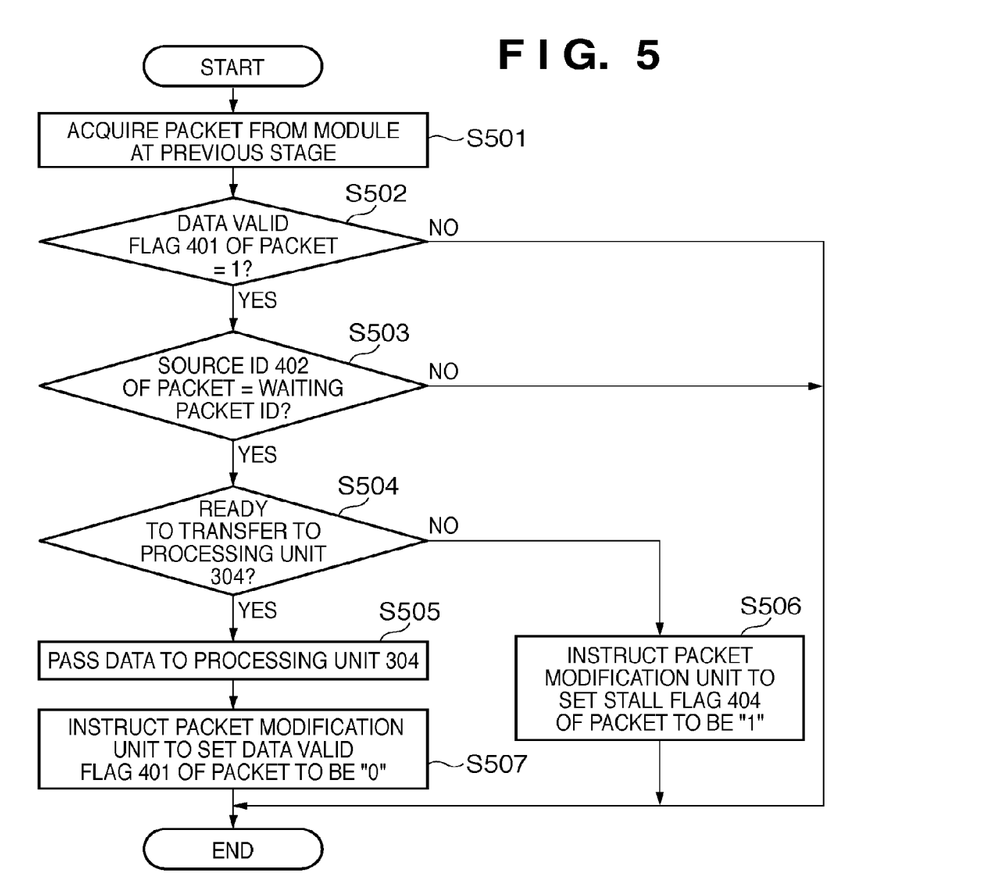
FIG. 5 is a flowchart showing an example of processing in a processing data transmission unit 303 and reception unit 311.

The processing in the processing data transmission unit 303 and reception unit 311 will be described below with reference to FIG. 5. In step S501, the packet identification unit 301 acquires a packet from a module located at a previous stage. The packet identification unit 301 checks in step S502 if the data valid flag 404 of the packet is valid (1). If the data valid flag 401 is valid ("YES" in step S502), the process advances to step S503. On the other hand, if the data valid flag 401 is not valid ("NO" in step S502), this processing ends.

The packet identification unit 301 checks in step S503 if the transmission source ID 402 of the packet is equal to the waiting packet ID set in the module. If it is determined that the two IDs are equal to each other ("YES" in step S503), the process advances to step S504. On the other hand, if it is determined that the two IDs are not equal to each other ("NO" in step S503), this processing ends.

The processing data transmission unit 303 checks in step S504 if the processing unit 304 is ready to exchange data. If it is determined that the processing unit 304 ready to exchange data ("YES" in step S504), the process advances to step S505. On the other hand, if it is determined that the processing unit 304 is not ready to receive data ("NO" in step S504), the process advances to step S506.

In step S505, the packet reception unit 302 extracts processing data from the packet, and transmits it to the processing data transmission unit 303, which passes the data to the processing unit 304. The process then advances to step S507. In step S506, the packet reception unit 302 instructs the packet modification unit 308 to set the stall flag 404 of the packet to be "1". Then, the stall flag 404 is modified from the initial value (0) to (1). In step S507, the packet reception unit 302 instructs the packet modification unit 308 to set the data valid flag 401 of the packet to be "0".

The data transmission sequence in the processing data reception unit 305 and transmission unit 312 will be described below. For example, a case will be examined below wherein data transfer is executed from module 1 with ID=1 to module 3 with ID=3 in FIG. 2. At this time, the packet generation unit 306 of module 1 acquires a packet in which the data valid flag 401 is invalid (0) from the packet modification unit 308.

Then, the packet generation unit 306 stores transmission data obtained from the processing data reception unit 305 in the data storage field 403 of that packet, and stores "1" as the ID of module 1 in the transmission source ID 402. Also, the packet generation unit 306 sets the stall flag 404 to be the initial value (0), and sets the data valid flag 401 to be "1". Then, the packet generation unit 306 transmits the packet to the packet transmission unit 307. The packet transmission unit 307 outputs the packet acquired from the packet generation unit 306 to the selector 309. At this time, the packet transmission unit 307 simultaneously outputs a select signal to the selector 309 so as to select its output.

The packet generation unit 306 monitors the stall flag 404 of the packet. When the packet output by itself is returned without setting the stall flag to be "1", the data valid flag 401 is set to be "0" so as to avoid the packet having no receiving module from occupying the ring bus. Conversely, when the stall flag 404 is set to be "1", that packet is output intact onto the ring bus.

Figure 6:
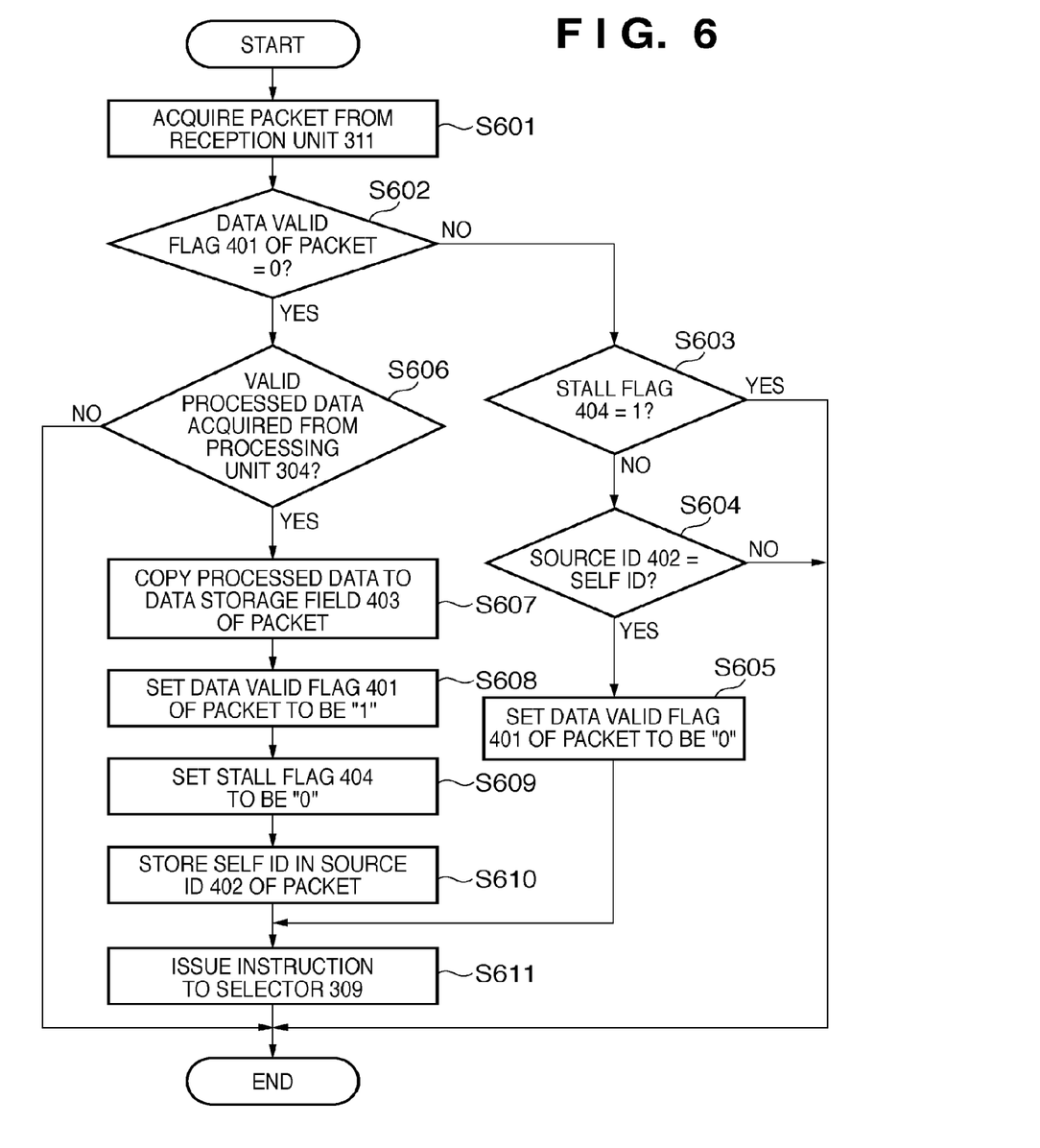
FIG. 6 is a flowchart showing an example of processing in a processing data reception unit 305 and transmission unit 312.

The processing in the processing data reception unit 305 and transmission unit 312 will be described below with reference to FIG. 6. Referring to FIG. 6, the packet generation unit 306 acquires a packet from the packet modification unit 308 of the reception unit 311 in step S601. The packet generation unit 306 checks in step S602 if the data valid flag 401 of the received packet is "0". If it is determined that the data valid flag 401 is not "0" ("NO" in step S602), the process advances to step S603. On the other hand, if it is determined that the data valid flag 401 is "0" ("YES" in step S602), the process advances to step S606.

The packet generation unit 306 checks in step S603 if the stall flag 404 of the packet is "1". If it is determined that the stall flag 404 is "1" ("YES" in step S603), the processing ends. In this case, the packet from the packet modification unit 308 is transmitted to the next module via the selector 309 and buffer 310. On the other hand, if it is determined that the stall flag 404 is not "1", i.e., it still has the initial value ("NO" in step S603), the process advances to step S604.

The packet generation unit 306 checks in step S604 if the transmission source ID 402 of the packet is equal to the ID of the self-module. If it is determined that the two IDs are equal to each other ("YES" in step S604), the process advances to step S605. In step S605, the packet generation unit 306 sets the data valid flag 401 of the packet to be "0", and the process then jumps to step S611. On the other hand, if it is determined that the two IDs are not equal to each other ("NO" in step S604), this processing ends. In this case as well, the packet from the packet modification unit 308 is transmitted to the next module via the selector 309 and buffer 310.

The packet generation unit 306 checks in step S606 if valid processed data is obtained from the processing unit 304. If the valid processed data is obtained ("YES" in step S606), the process advances to step S607. On the other hand, if no valid processed data is obtained ("NO" in step S606), this processing ends.

In step S607, the packet generation unit 306 copies the processed data acquired from the processing unit 304 to the data storage field 403 of the packet. In step S608, the packet generation unit 306 sets the data valid flag 401 of the packet to be "1". Furthermore, in step S609 the packet generation unit 306 sets the stall flag 404 of the packet to be the initial value (0). Moreover, in step S610 the packet generation unit 306 sets the self ID in the transmission source ID 402 of the packet. In step S611, the packet generation unit 306 instructs the selector 309 to preferentially select the input from the packet transmission unit 307.

As described above, according to this embodiment, when the receiving module can process data of a received packet, it invalidates the packet; when the receiving module cannot process data, it sets the stall flag 404 of the packet to be "1" and re-enters the packet onto the ring bus. The receiving module can manage a packet to be received so as to prevent a re-transmission request packet to the transmitting module from being output onto the ring bus. Since the transmitting module monitors the stall flag 404 of the output packet and invalidates the packet as needed, an unnecessary packet can be prevented from going around on the ring bus, thus enhancing the data transfer efficiency among the modules.

In this embodiment, the number of destination modules of the packet is one. However, the number of destinations is not limited to one, and the data path may branch. For example, this is the case when modules 3 and 4 wait for an output packet from module 2 in FIG. 2. That is, the data path after module 2 branches.

In the above embodiment, when data is successfully transferred to the processing unit 304, the received packet is invalidated. However, if the packet is similarly invalidated since module 3 successfully receives the packet, module 4 can no longer receive the packet.

Hence, each module according to an embodiment corresponding to another aspect of the present invention is characterized by further including a packet invalidate processing instruction register which can designate whether or not to permit invalidation of a packet when data is successfully transferred to the processing unit 304.

Figure 7:
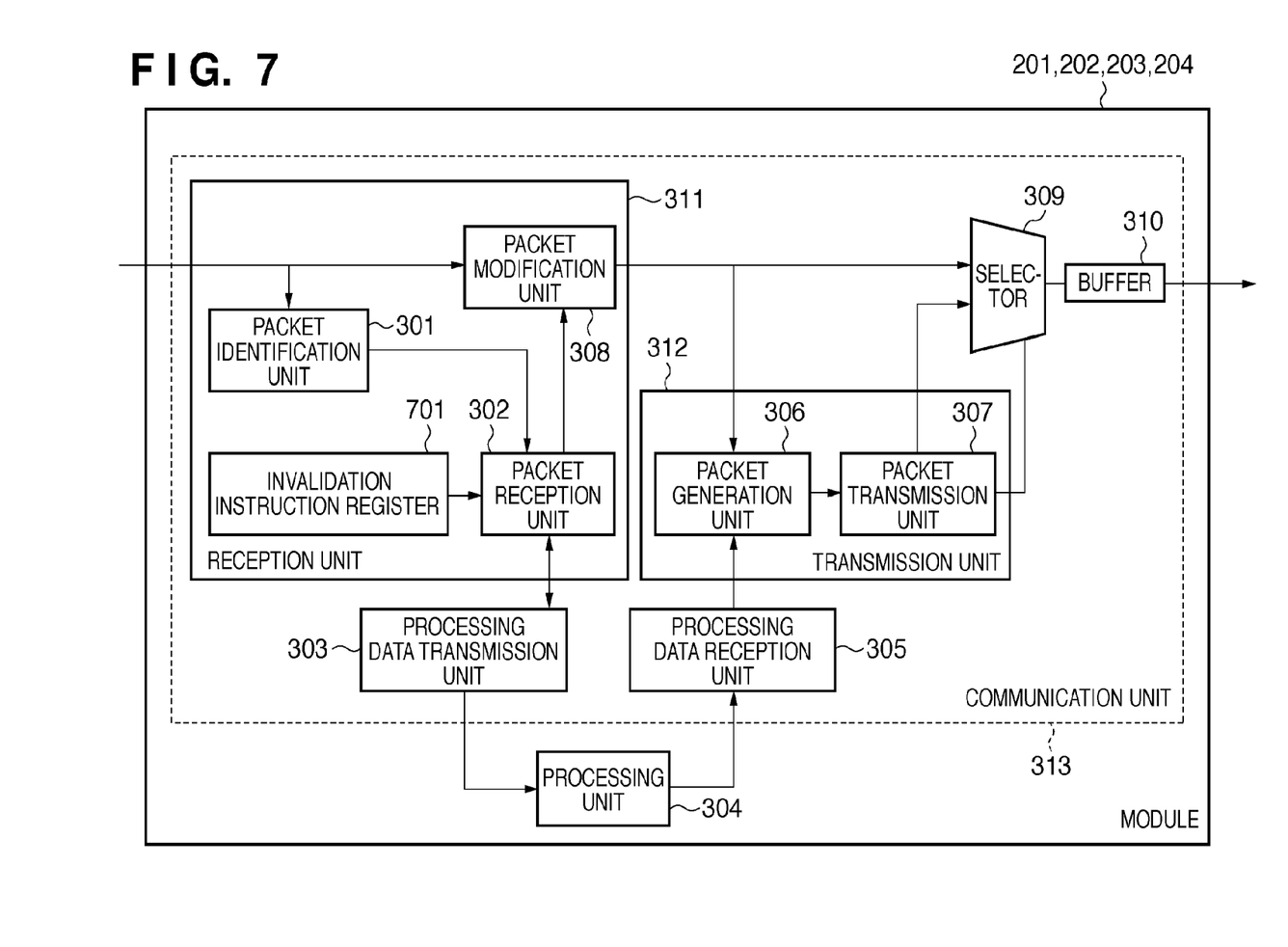
FIG. 7 is a block diagram showing an example of the arrangement of a module.

FIG. 7 is a block diagram showing an example of the arrangement of a module according to this embodiment. The module block diagram shown in FIG. 7 is basically the same as that shown in FIG. 3. However, unlike in FIG. 3, a reception unit 311 further includes an invalidation instruction register 701. In this embodiment, when this register preset value is "1", it is permitted to invalidate a received packet by setting the value of a data valid flag 401 at the time of successful reception by a processing unit 304. On the other hand, if the preset value is "0", it is not permitted to invalidate a received packet by setting the value of the data valid flag 401 at the time of successful reception by the processing unit 304. However, the setting specification of the packet invalidate processing instruction register is not limited to the above.

The invalidation instruction register 701 is set as follows. When it is assumed that a data path does not branch, the packet invalidate processing instruction registers of all modules are set to be "1". In this case, at the time of successful reception, a packet is invalidated.

On the other hand, when a plurality of modules wait for an output packet from a certain module, a transmission source module which outputs a packet that the plurality of modules wait for is specified first, and the plurality of destination modules which wait for that packet are similarly specified.

Of the plurality of destination modules, a module which is allocated at a position farthest from the transmission source module along a ring bus is specified, and the invalidation instruction register 701 of this module is set to be "1". The invalidation instruction registers 701 of modules other than that module are set to be "0".

Figure 2:
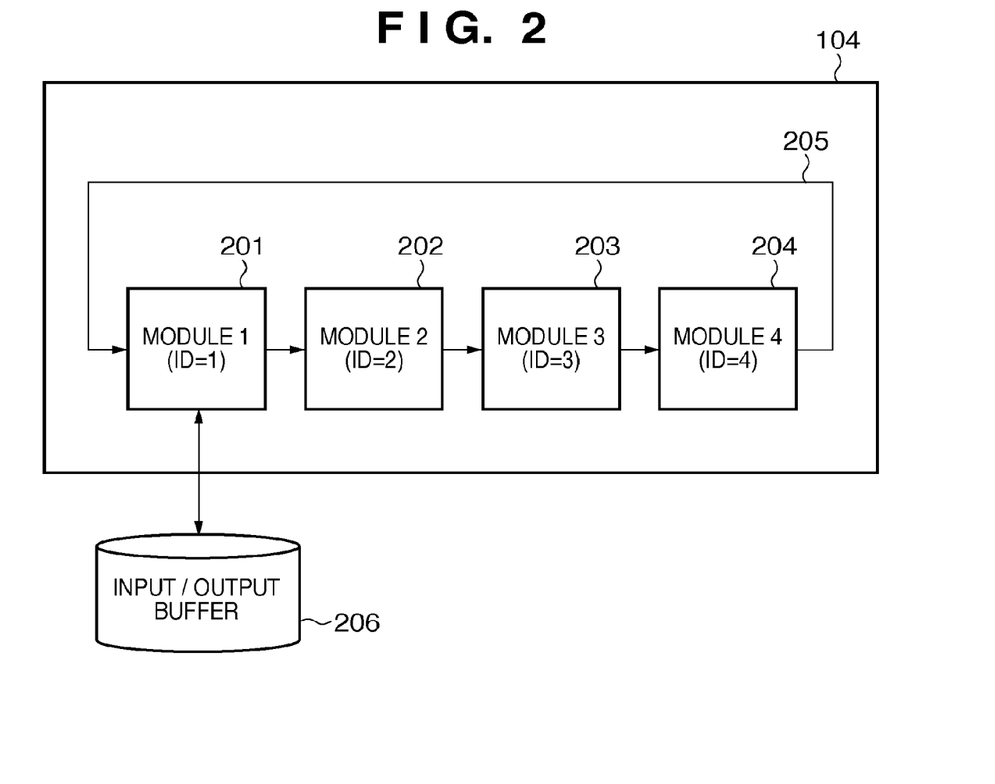
FIG. 2 is a block diagram showing an example of the arrangement of a data processor 104.

For example, when the data path branches at one position like in a case in which modules 3 and 4 wait for an output packet from module 2 in FIG. 2, the ring bus is traced from module 2 as the transmission source module in a forward direction. Of modules 3 and 4 that wait for a packet, module 4 is allocated at a position farthest from module 2. Hence, the invalidation instruction register 701 of module 3 is set to be "0", and that of module 4 is set to be "1".

Figure 8:
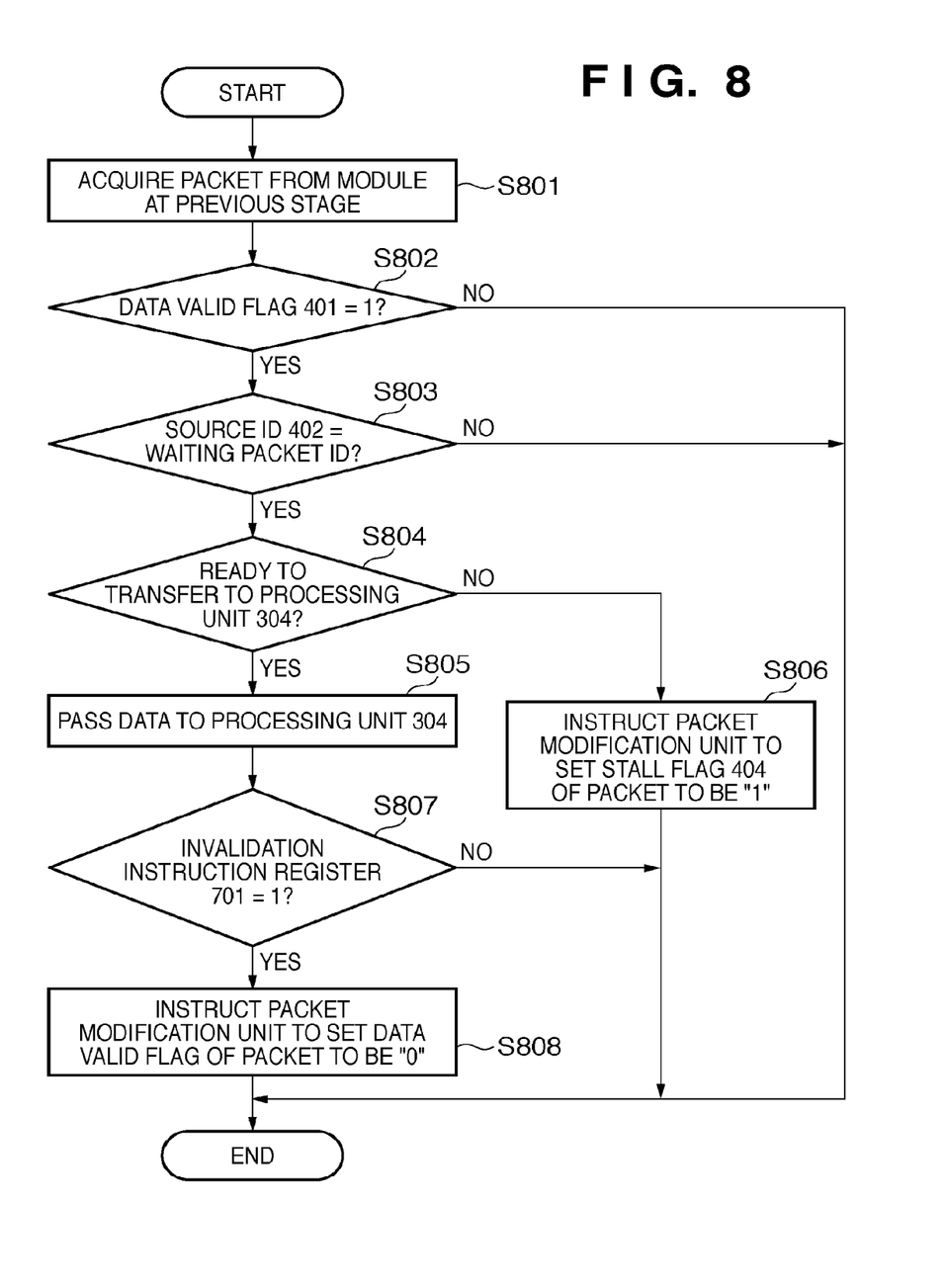
FIG. 8 is a flowchart showing an example of processing in a processing data transmission unit 303 and reception unit 311.

The processing in a processing data transmission unit 303 and reception unit 311 in this embodiment will be described below with reference to FIG. 8. Referring to FIG. 8, a packet identification unit 301 acquires a packet from a module located at a previous stage in step S801. The packet identification unit 301 checks in step S802 if the data valid flag 401 of the packet is "1". If the data valid flag 401 is "1" ("YES" in step S802), the process advances to step S803. On the other hand, if the data valid flag 401 is not "1" ("NO" in step S802), this processing ends.

The packet identification unit 301 checks in step S803 if a transmission source ID 402 of the packet is equal to a preset waiting packet ID. If it is determined that the two IDs are equal to each other ("YES" in step S803), the process advances to step S804. On the other hand, if it is determined that the two IDs are not equal to each other ("NO" in step S803), this processing ends.

The processing data transmission unit 303 checks in step S804 if the processing unit 304 is ready to exchange data. If it is determined that the processing unit 304 is ready to exchange data ("YES" in step S804), the process advances to step S805. On the other hand, if it is determined that the processing unit 304 is not ready to exchange data ("NO" in step S804), the process advances to step S806.

In step S805, a packet reception unit 302 extracts processing data from the packet and transmits it to the processing data transmission unit 303, which passes that data to the processing unit 304. Then, the process advances to step S807. In step S806, the packet reception unit 302 instructs a packet modification unit 308 to set a stall flag 404 of the packet to be "1".

On the other hand, the packet reception unit 302 checks in step S807 if the preset value of the invalidation instruction register 701 is "1". If it is determined that the preset value is "1" ("YES" in step S807), the process advances to step S808. On the other hand, if it is determined that the preset value is not "1" ("NO" in step S807), this processing ends. In step S808, the packet reception unit 302 instructs the packet modification unit 308 to set the data valid flag 401 to be "0".

As described above, even when the data path branches, since the module includes the invalidation instruction register 701, which is set as needed, a packet can be transmitted to all of a plurality of waiting modules.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-043148, filed Feb. 25, 2009, which is hereby incorporated by reference herein in its entirety.

The invention claimed is:

1. A module, for processing data, communicably connected to one or more other modules via a ring bus for transferring packets between modules, the module comprising:
   a circuit configured to perform as:
      a communication unit configured to receive a packet from one of the other modules via the ring bus and to transmit the packet to another one of the other modules via the ring bus; and
      a processing unit configured to process data,
   wherein the communication unit includes:
      an identification unit configured to identify whether or not the received packet includes the data to be processed by the processing unit;
      a determination unit configured to determine whether or not the processing unit is ready to process the data; and
      a setting unit configured to set first information of the received packet, wherein the first information indicates whether or not processing of the data included in the packet is stalled, and wherein, when the identification unit identifies that the received packet includes the data to be processed by the processing unit, and the determination unit determines that the processing unit is not ready to process the data, the setting unit sets the first information of the received packet to indicate that the processing of the data is stalled, and the communication unit transfers the packet, which includes the data not processed by the processing unit and the first information set by the setting unit indicating that the processing of the data is stalled, to the other one of the other modules via the ring bus.

2. The module according to claim 1, wherein the communication unit further includes a receiver configured to receive a packet, identified by the identification unit to include data to be processed by the processing unit, and to extract the data to be processed by the processing unit from the received packet.

3. The module according to claim 2, wherein, when the determination unit determines that the processing unit is ready to process the data, the receiver provides the processing unit with the data to be processed.

4. The module according to claim 1, wherein, when second information of the received packet indicates that the received packet is valid, and when third information of the received packet is same as the identification by the identification unit, the identification unit identifies that the received packet includes the data to be processed by the processing unit.

5. The module according to claim 4, wherein the communication unit does not change information in the received packet to be used for identifying whether or not the received packet includes the data to be processed by the processing unit.

6. The module according to claim 1, wherein, when the identification unit identifies that the received packet includes the data to be processed by the processing unit, and the determination unit determines that the processing unit is ready to process the data, the setting unit sets second information of the received packet to indicate that the packet is invalid.

7. The module according to claim 1, wherein the packet, which includes the data not processed by the processing unit and the first information set by the setting unit indicating that the processing of the data is stalled, to the other one of the other modules via the ring bus, returns to the communication unit which transmitted the stalled packet, after circulating through the ring bus.

8. The module according to claim 1, wherein at least one of the module and the one or more other modules includes the circuit further configured to perform as a control unit configured to control transmission of the received packet based on the first information of the received packet.

9. A module, for processing data, communicably connected to one or more other modules via a ring bus for transferring packets between modules, the module comprising:
a circuit configured to perform as:
a packet identification unit configured to acquire a packet in which a data valid flag is valid and to compare a transmission source ID in the acquired packet with a self-waiting packet ID, to determine whether or not the transmission source ID is same as the self-waiting packet ID;
a packet receiver configured to receive the packet from the packet identification unit when the transmission source ID is same as the self-waiting packet ID, and to extract data to be processed by the processing unit from the received packet, or to instruct to set stall information to first information of the received packet, indicating that the processing of the data is stalled;
a packet modification unit configured to set the stall information in the received packet according to the instruction from the packet receiver;
a processing unit configured to process the data;
a processing data transmission unit configured to determine whether or not the processing unit is ready to process the data, and to provide the data from the packet receiver to the processing unit when the processing unit is ready to process the data; and
a selection unit configured to select, a packet received from the packet modification unit, or a packet that includes data processed by the processing unit, as the packet to be transmitted to another module,
wherein, when the processing data transmission unit determines that the processing unit is ready to process the data, the packet receiver extracts the data to be processed by the processing unit from the received packet, and
wherein, when the processing data transmission unit determines that the processing unit is not ready to process the data, the packet receiver sets stall information of the received packet to indicate that the processing of the data is stalled and not change the transmission source ID of the received packet.

10. The module according to claim 9, wherein the memory is configured to store a packet to be transmitted to the other module from the selection unit, wherein the packet to be transmitted includes data not processed by the processing unit, and the first information, to which the stall information is set to indicate that the processing of the data is stalled.

11. The module according to claim 9, wherein the circuit is further configured to perform as:
a packet generation unit configured to generate a packet that includes information indicating that the packet is invalid and the data to be processed by the processing unit; and
a packet transmission unit configured to provide the packet received from the packet generation unit to the selection unit.

12. The module according to claim 11, wherein the packet generation unit receives the packet from the packet modification unit.

13. The module according to claim 12, wherein the packet generation unit checks a value of the first information of the packet and does not generate the packet when the first information indicates that the processing of the data included in the packet is stalled.

14. The module according to claim 13, wherein the packet generation unit generates the packet when the packet received from the packet modification unit is invalid and the packet generation unit receives the data processed by the processing unit.

15. The module according to claim 11, wherein the packet generation unit:
copies the data processed by the processing unit to a data storage field of the received packet;
sets a valid information of the received packet to a state indicating that the packet is valid;
sets the first information of the received packet to a state indicating that the processing of the data is not stalled;
sets a transmission source ID of the received packet to a self ID; and
instructs the selection unit to select the input from the packet transmission unit.

16. An information processing apparatus comprising:
a plurality of modules that are connected via a ring bus,
wherein each of the plurality of modules is configured to receive a packet that includes data from a neighboring module, which is configured to be transmitted to another neighboring module,
wherein at least one of the plurality of modules includes a circuit configured to perform as:
a communication unit configured to receive a packet from one of the other modules via the ring bus and to transmit the packet to another one of the other modules via the ring bus; and
a processing unit configured to process data,
wherein the communication unit includes:
an identification unit configured to identify whether or not the received packet includes the data to be processed by the processing unit;
a determination unit configured to determine whether or not the processing unit is ready to process the data; and
a setting unit configured to set first information of the received packet, wherein the first information indicates whether or not processing of the data included in the packet is stalled,
wherein, when the identification unit identifies that the received packet includes the data to be processed by the processing unit, and the determination unit determines that the processing unit is not ready to process the data, the setting unit sets the first information of the received packet to indicate that the processing of the data is stalled, and the communication unit transfers the packet, which includes data not processed by the processing unit and the first information set by the setting unit indicating that the processing of the data is stalled, to the other one of the other modules via the ring bus.

17. The information processing apparatus according to claim 16, wherein the at least one of the plurality of modules includes the circuit further configured to perform as a control unit configured to control transmission of the received packet based on the first information of the received packet.

18. An operation method of a module for processing data, wherein the module is communicably connected to one or more other modules via a ring bus for transferring packets between modules, the operation method of the module comprising steps of:
receiving a packet from one of the other modules via the ring bus;
transmitting the packet to another one of the other modules via the ring bus;
processing data;
identifying whether or not the received packet includes data to be processed by a processing unit;
determining whether or not the data is ready to be processed by the processing unit; and
setting first information of the received packet, wherein the first information indicates whether or not processing of the data included in the packet is stalled, and wherein, in the case that the received packet includes the data to be processed by the processing unit, and upon the condition that the processing unit is not ready to process the data, the first information of the received packet is set to indicate that the processing of the data is stalled; and
transferring the packet, which includes data not processed by the processing unit and the set first information indicating that the processing of the data is stalled, to the other one of the other modules via the ring bus.

19. The operation method according to claim 18, further comprising, in at least one of the module and the one or more other modules, a step of controlling transmission of the received packet based on the first information of the received packet.

20. An operation method of a module for processing data, wherein the module is communicably connected to one or more other modules via a ring bus for transferring packets between modules, the operation method of the module comprising steps of:
acquiring a packet received from another module in which a data valid flag is valid;
comparing a transmission source ID in the acquired packet with a self-waiting packet ID to determine whether or not the transmission source ID is same as the self-waiting packet ID;
wherein, when the transmission source ID is same as the self-waiting packet ID, extracting data to be processed by a processing unit from the received packet, or instructing to set stall information to first information of the received packet, indicating that the processing of the data is stalled;
setting the stall information in the received packet according to the instruction;
determining whether or not the data is ready to be processed by the processing unit;
providing the data to the processing unit when the processing unit is ready to process the data; and
selecting a packet to which the stall information is set, or a packet that includes data processed by the processing unit, as the packet to be transmitted to another module;
wherein, in the case that the processing unit is ready to process the data, extracting the data to be processed by the processing unit from the received packet, and
wherein, when upon the condition that the processing unit is not ready to process the data, setting stall information of the received packet to indicate that the processing of the data is stalled and not change the transmission source ID of the received packet.

21. An operation method of an information processing apparatus that includes a plurality of modules that are connected via a ring bus, the operation method comprising steps of:
receiving, by each of the plurality of modules, a packet that includes data from one neighboring module, which is configured to be transmitted to another neighboring module; and
by at least one of the plurality of modules:
receiving a packet from one of the other modules via the ring bus;
transmitting the packet to another one of the other modules via the ring bus;
processing data;
identifying whether or not the received packet includes data to be processed by the processing unit;
determining whether or the data is ready to be processed by the processing unit; and
setting first information of the received packet, wherein the first information indicates whether or not processing of the data included in the packet is stalled, and wherein, in the case that the received packet includes the data to be processed by the processing unit, and upon the condition that the processing unit is not ready to process the data, the first information of the received packet is set to indicate that the processing of the data is stalled; and
transferring the packet, which includes data not processed by the processing unit and the set first information indicating that the processing of the data is stalled, to the other one of the other modules via the ring bus.

* * * * *